Oct. 20, 1953     J. MIHALYI ET AL     2,655,832
RANGE FINDER ADJUSTING MECHANISM
Filed Jan. 6, 1951     3 Sheets-Sheet 2
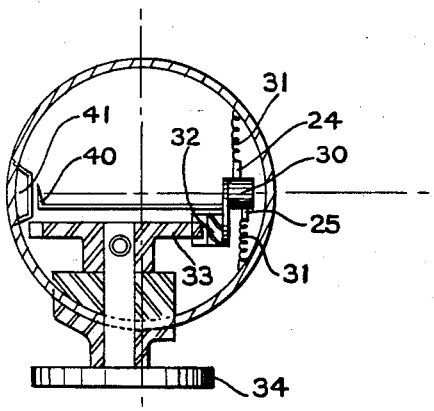
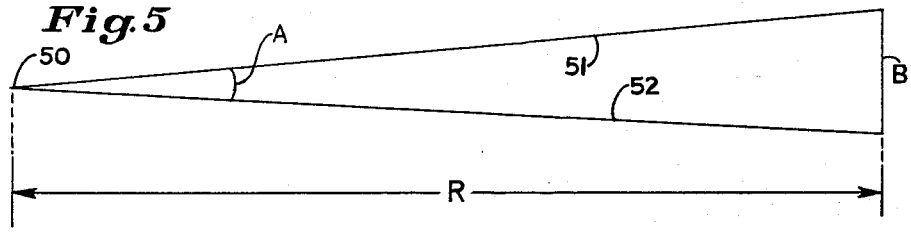
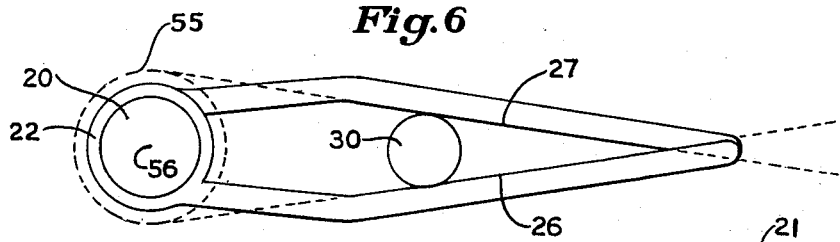
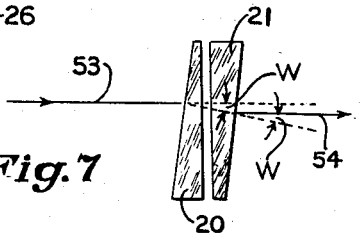
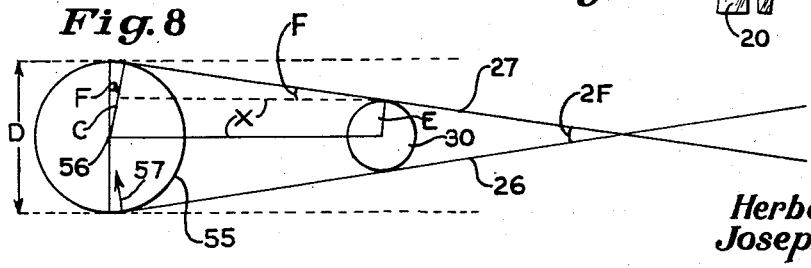
Herbert A. Bing
Joseph Mihalyi
Inventors Oct. 20, 1953  J. MIHALYI ET AL  2,655,832
RANGE FINDER ADJUSTING MECHANISM
Filed Jan. 6, 1951  3 Sheets-Sheet 3
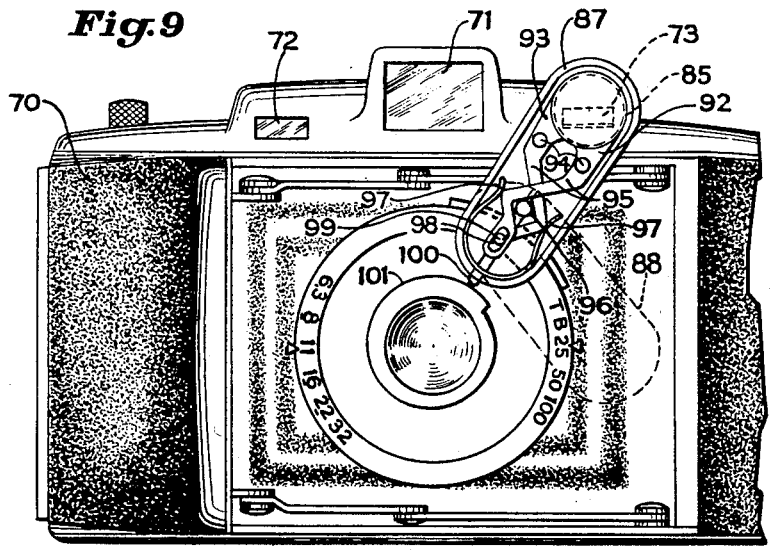
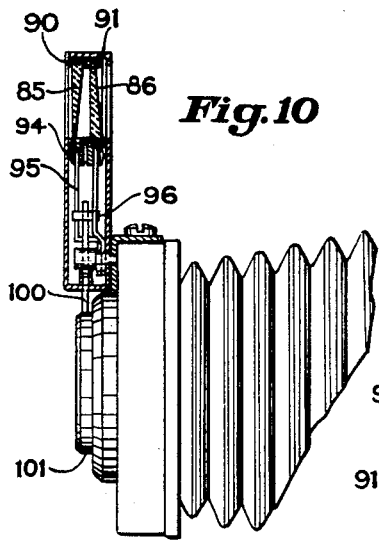
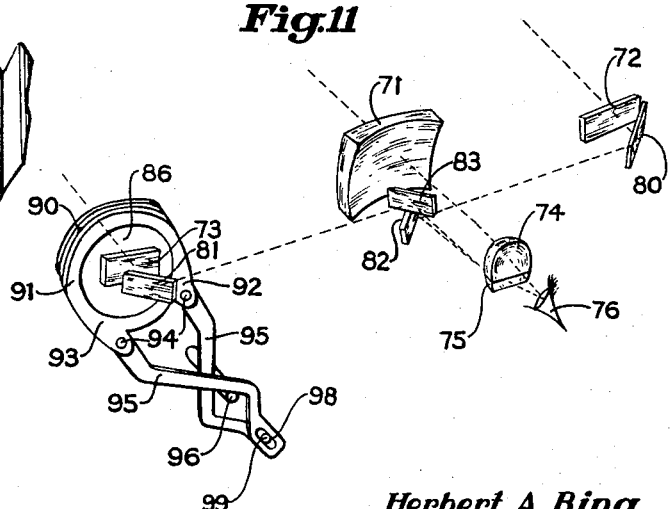
Herbert A. Bing
Joseph Mihalyi
Inventors Patented Oct. 20, 1953

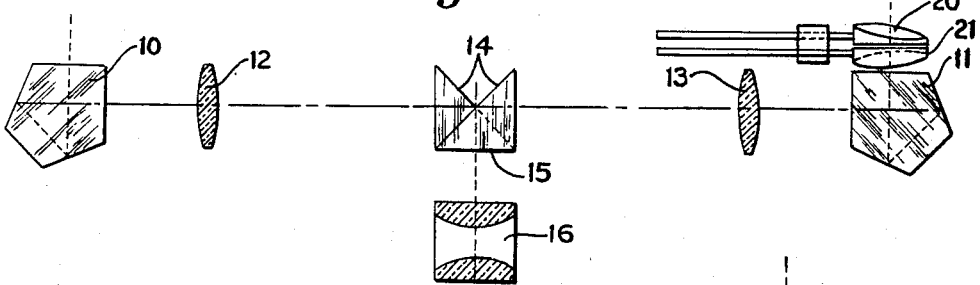
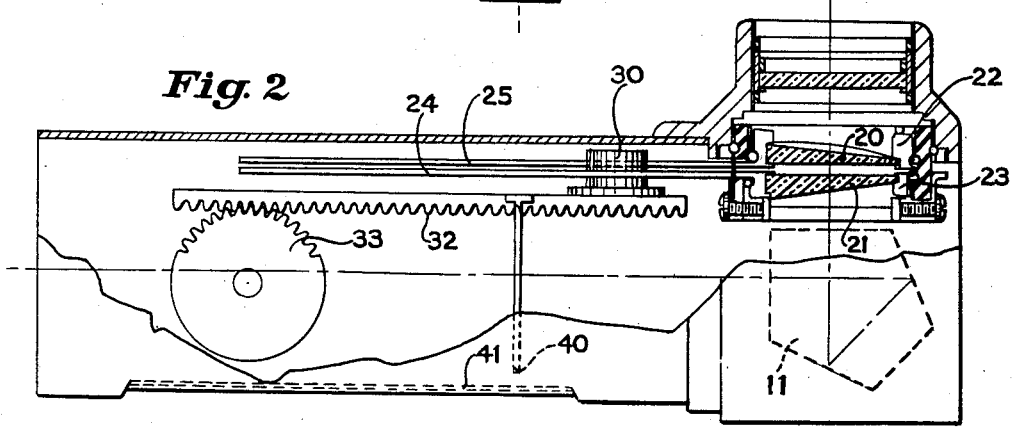
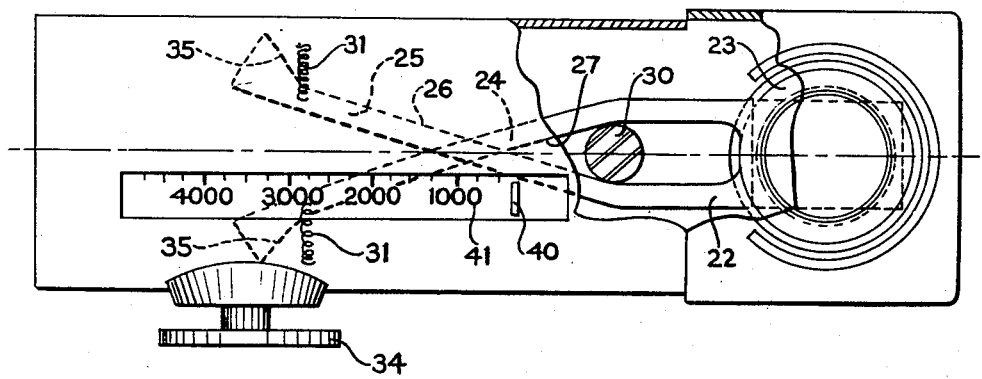
Herbert A. Bing
Joseph Mihalyi
Inventors

2,655,832

UNITED STATES PATENT OFFICE 2,655,832

RANGE FINDER ADJUSTING MECHANISM

Joseph Mihalyi and Herbert A. Bing, Rochester, N. Y., assignors to Eastman Kodak Company, Rochester, N. Y., a corporation of New Jersey Application January 6, 1951, Serial No. 204,712

1 Claim. (Cl. 88—1)

This invention relates to range finders, particularly to military range finders, although one embodiment thereof is applicable to camera range finders.

It is the object of the invention to provide a light deviating means for range finders which is of simple construction and which is extremely accurate in its operation. In common with the light deviating means described in U. S. Patent 2,476,013, Wittel, one embodiment of the present invention has for its object the provision of so-called "equi-crescent" ranging in which the adjusting mechanism is moved or rotated linearly with respect to range or distance of the target being ranged. The Wittel patent just referred to involves a light deviating mechanism of the tilting plate type whereas the present invention employs rotating wedges, and accordingly the relationships involved in producing the "linearity" in the two systems are entirely different. Prior to the present invention it was not known that equi-crescent ranging was possible with rotating wedges. The trigonometrical relationships involved in the present invention will be discussed in connection with the drawings and it will be seen that with one particular arrangement of parts, the required linearity is inherent.

Of course, rotating wedges have been used as light deviating devices in range finders and have even been operated by levers pushed by flat members. However, equi-crescent ranging is not obtained except with one particular arrangement of the present invention.

In a light deviating mechanism, according to the invention, an arm extends transversely but non-radially from the rim of each of the two wedges which are disposed in successive planes orthogonal to the light beam and are wedged transversely of the light beam. Each arm is provided with a straight edge and the two straight edges are in general crossed, but have directions which at zero deviation (i. e. when the two wedges are exactly opposed so as to fully compensate for each other) are parallel and separated by some reference distance D. A single pin engages both of these straight edges and must have a diameter different from D, and in any practical embodiment it is less than D. This single pin simultaneously engages both straight edges and springs are provided for holding the straight edges and pin in this engagement. As the pin is moved radially toward and away from the wedges, the wedges are rotated in opposite directions to deviate the light beam through an angle inversely proportional to the movement of the pin and for the small angles encountered in range finding this means that the range is directly proportional to the movement of the pin. The deviation is in a plane (herein referred to as horizontal) at right angles to the direction of wedging at "infinity" or zero deviation setting. That is, the vertical components of the deviation always compensate each other. When the straight edges are in the parallel setting they are also parallel to the line of motion of the pin but this need not be horizontal. The case where this line of motion is horizontal is perhaps the easiest to describe and understand but it will be understood that this radial line of motion may be horizontal, vertical or at any angle to the plane of deviation.

This arrangement of pin and straight edges has been found to give equi-crescent ranging when applied to military range finders. In the case of camera range finders, it is not necessary to have equi-crescent ranging, but nevertheless the present invention gives an extremely simple and highly desirable form of light deviating means for the ranging mechanism.

The operation of the present invention and the various embodiments thereof will be fully understood from the following description when read in connection with the accompanying drawings in which:

Fig. 1 is a plan view of an optical system of a range finder incorporating the present invention;

Fig. 2 is a plan view of the light deviating mechanism shown in Fig. 1 and its associated parts;

Fig. 3 is a rear elevation, partly broken away, of the details shown in Fig. 2;

Fig. 4 is a vertical section through the mechanism in Figs. 2 and 3;

Figs. 5, 6, 7 and 8 are diagrams to explain the trigonometrical relationships involved in the present invention;

Figs. 9, 10 and 11 are respectively a front view, a side elevation and a perspective view of the optical system of an embodiment of the invention applied to a photographic camera.

In Fig. 1 a range finder includes penta prisms 10 and 11 for receiving light beams from a target and for directing them horizontally through lenses 12 and 13 and crossed reflectors 14 into focus on the surface 15 of the crossed reflectors forming a split field which is viewed through an eyepiece 16. According to the invention one of the range finder beams, namely that incident on the penta prism 11, passes through two wedges 20 and 21 which are mounted to be rotatable in opposite directions by equal amounts. As shown in greater detail in Figs. 2–4, the wedges 20 and 21 are carried on rims 22 and 23 provided with arms 24 and 25 respectively having straight edges 26 and 27 which are crossed relative to one another in the arrangement shown. When these rims 22 and 23 are rotated to the setting at which the wedge 20 points straight up and the wedge 21 points straight down, the wedges 20 and 21 are exactly opposed so that there is zero deviation of the light (i. e. the range finder is set for infinity) and the two straight edges 26 and 27 are parallel. It is unnecessary to range on infinity in many practical devices, and sometimes no provision is made for an infinity setting. In any case there is either an actual infinity setting or a theoretical one just beyond the range of the instrument and the rotation of the edges 26 and 27 is such that they reach or would reach exact parallelism at the infinity setting. This feature is critical to this embodiment of the invention, although the existence of an actual infinity setting is not critical.

The straight edges 26 and 27 are held in engagement with a pin 30 by springs 31. The pin 30 is mounted on a rack 32 for radial movement relative to the optic axis which passes more or less through the center of the wedges 20 and 21. Since optical wedges have the same effect all across the field in the beam of light coming from the target, the position of the periphery of each wedge relative to the optic axis is not critical but the common axis of rotation of the two wedges is the optic axis of the pair of wedges.

As the rack 32 is moved by rotation of a pinion 33 (by means of a knob 34 on the outside of the instrument), the arms 24 and 25 are rotated about the optic axis of the wedges and, at the same time, a pointed 40 moves along a scale 41 giving the range. It will be noted that the range is linear on the scale 41. In order to have a scale extending to infinity, with a linear portion and then with a compressed portion, the ends of the arms 24 and 25 are shaped so that the straight edge portions 26 and 27 terminate near the ends of the arms, and the ends are of increasing width as shown by the broken lines 35.

Figs. 5, 6, 7 and 8 are included to explain how the arrangement shown in Figs. 1–4 produces equi-crescent ranging, i. e. why a movement of the pin 30 corresponds linearly to a change in range of a target. In Fig. 5 a target 50 at a distance or range R is viewed by a range finder whose base is represented by B. The two light beams 51 and 52 from the target to the range finder are parallel when the target is at infinity and for any nearer distance form an angle A with each other. If one of the beams is considered fixed, the other beam must be deviated through an angle A so as to enter the range finder parallel to the first beam. According to the invention this deviation is produced by the two wedges 20 and 21 immediately in front of the range finder penta prism 11 (in Fig. 1).

A front view and a vertical section of the essential parts are reproduced in Figs. 6 and 7. If the wedges are rotated so that the straight edges 26 and 27 are parallel, the wedges are diametrically opposed as shown in Fig. 7 so that a ray 53 entering the wedge 20 is deviated through an angle W and then, by the wedge 20 is deviated back by an angle W to emerge at 54 parallel to the direction of incidence. Thus W represents the angular deviation of a light ray by each wedge. As long as the two wedges exactly compensate each other the total deviation is zero as shown in Fig. 7. However, when the wedges are rotated equal amounts in opposite directions as shown in Fig. 6, the resultant deviation can be computed with reference to Fig. 8 which corresponds to Fig. 6.

In Figs. 6 and 8 the large circle 55 with a radius C and a diameter D is the circle whose center is the axis of rotation of the wedges and which touches the straight lines (projected) constituting the straight edges 26 and 27. The straight edges 27 and 26 are thus tangent to the circle 55 at all times and are separated by a distance D when parallel, i. e. when at the infinity setting. When the pin 30 is at a distance X from the optic axis or rotation axis 56, the straight edges 26 and 27 form an angle 2F as shown in Fig. 8 and each of the wedges has been rotated from the vertical through an angle F so that the direction of the wedge 20 is along the line 57 which is perpendicular to the straight edge 26. When both wedges are rotated through this small angle F the deviations in the vertical plane (i. e. the vertical components of the deviation) still compensate each other, but the components of the deviations in the horizontal plane add together to produce the deviation required by the ranging mechanism.

In Fig. 8 the wedge 20 (see Fig. 6) is wedged in the direction of the arrow 57 and the other wedge (21) is wedged in the opposite direction along the line C (at right angles to the line 27). The deviations of light by the wedges is respectively in the planes of the arrow 57 and the line C. The vertical components of these deviations are each equal to (W cos F) and are in opposite directions so that they cancel. The horizontal component for each wedge equals (W sin F) and the total horizontal deviation is (2W sin F).

From the geometry of Fig. 8 and particularly with reference to the dotted line whose length is X, it is seen that sin F equals $$\frac{C-E}{X}$$

where E is the radius of the pin 30.

Therefore the deviation of light in the horizontal plane due to the rotation of the two wedges equals $$2W\left(\frac{C-E}{X}\right)$$

Reference now to Fig. 5 shows that the deviation A for small angles equals $$\frac{B}{R}$$

(The angle A, in any practical ranging, is so small that no appreciable error is introduced by assuming sin $A$ = tan $A$ = $A$.

Therefore $$R=\frac{B}{A}=\frac{BX}{2W(C-E)}$$

Since B, W, C and E are constants, the range R is a linear function of the distance X, which means that the device gives equi-crescent ranging as required.

In the actual embodiment shown in Figs. 1 to 4 and in the explanation provided by Figs. 5 to 8, the line of movement of the pin 30 is horizontal and, when the straight edges 26 and 27 are parallel they too are horizontal. This embodiment of the invention requires the direction of motion of the pin and the infinity setting of the straight edges to all be parallel to one another, but it does not require this direction to be horizontal. For horizontal deviation of light, the infinity setting of the wedges must have one wedge pointing vertically upward and the other pointing vertically downward, but the parallel arms may extend in any transverse direction from the wedges. The rotation of the wedges and hence the deviation of the light is the same no matter how the direction of motion of the pin is oriented transversely to the axis, i. e. no matter how the wedges are oriented in their rims relative to the control arms.

The mechanism of this invention is a simple one and is directly applicable to camera range finders, although there is no special advantage in camera range finders having equi-crescent ranging since the focusing of a lens is not a simple linear function.

Rotating wedges operated by cross straight edges and a single pin is a highly desirable mechanism and a simple embodiment thereof in a camera range finder as shown in Figs. 9–11.

In Figs. 9 to 11 a camera 70 is provided with a view finder window 71 and two range finder windows 72 and 73. The eye-piece 74 for the view finder is provided with a zero focusing power wedged section 75 which deviates the light from the range finder beams upward to the eye 76 which is receiving the view finder beam through the eyepiece 74. End mirrors 80 and 81 and crossed reflectors 82 and 83 are fixed in the range finder system. Deviation of the light for ranging is accomplished in front of the window 73 by wedges 85 and 86 mounted in a housing 87 which may be rotated to the position 88 shown by broken lines when the camera is to be folded, but which is held in the position 87 as shown in Fig. 9 when operating.

The wedges 85 and 86 are held in rims 90 and 91 to be rotated in opposite directions by short arms 92 and 93. Each of these arms terminates in a pivot 94 which rotatably hold crisscross or geniculate shaped members 95. These members 95 are engaged by a pin 96 and are held in engagement with this pin by springs 97. The pin 96 is carried by a cam follower 100 which rides on, and is spring urged into contact with, a cam 101 which rotates with the focusing mechanism of the camera lens. Each of the members 95 is provided with an elongated slot 98 which slides on a rod 99 which supports the bearing for the cam follower 100. As the cam 101 is rotated the pin 96 moves radially relative to the rotation axis of the wedges 85 and 86. As the pin 96 moves away from the camera lens and toward the wedges, it pushes the members 95 so that the pivots 94 move further apart (lazy tong fashion relative to the fixed axis of rotation of the wedges, by sliding on the pivot 99). The wedges rotate the other way as the pin 96 moves toward the camera lens. The wedges may be set to point vertical upward and downward respectively when they exactly compensate but since linearity is not essential and since one never wants to focus and range beyond infinity, the wedges are usually set to have their zero deviation in the middle of the useful range and to give an "outward" or "negative" deviation at infinity setting. In this case, of course, the mirrors 80, 81, 82 and 83 are set to correct for this negative deviation. The rate of change of light deviation with rotation of the camera focusing mechanism is thus a function of the shape of the cam 101, the radius of the pin 96, the slope of the members 95, the length of these members 95 from the pivot 99 to the pivot 94, the length of the arms 92 and 93 and the orientation of the wedges 85 and 86, the only limit on this latter orientation being that the wedges must be symmetrical about the "horizontal" so that there is no vertical deviation of the light beam.

Having thus described in detail two embodiments of our invention and the principle thereof, we claim:

An optical device for deviating a beam of light comprising two equal power wedges of transparent light refractive material wedged transversely of the light beam in successive planes orthogonal to the beam, rims supporting the wedges rotatable in said planes about a common rotation axis, an arm rigidly attached to each rim and extending laterally but non-radially from each rim with a straight edge on each arm, the straight edges being equidistant from said rotation axis and in general crossed but having directions which, at zero deviation setting of the device with the two wedges directly opposed, are parallel, facing each other, and separated a distance D, a single circular pin of diameter less than D positioned between the crossing point of the straight edges and said rotation axis and engaging both straight edges, means for holding the straight edges in engagement with the pin and means for moving the pin radially to and from the optic axis to rotate the wedges in opposite directions to deviate the beam through an angle inversely proportional to the distance of the pin from said rotation axis.

JOSEPH MIHALYI.
HERBERT A. BING.

References Cited in the file of this patent

UNITED STATES PATENTS

| Number | Name | Date |
|---|---|---|
| 419,910 | Berthon | Jan. 21, 1890 |
| 2,040,050 | Kuppenbender | May 5, 1936 |
| 2,150,544 | Eppenstein | Mar. 14, 1939 |

FOREIGN PATENTS

| Number | Country | Date |
|---|---|---|
| 641,050 | Germany | Jan. 18, 1937 |